(12) United States Patent
Croot et al.

(10) Patent No.: US 10,516,581 B2
(45) Date of Patent: Dec. 24, 2019

(54) ACCESS NETWORK MANAGEMENT

(71) Applicant: BRITISH TELECOMMUNICATIONS PUBLIC LIMITED COMPANY, London (GB)

(72) Inventors: Christopher Marcus Croot, London (GB); Trevor Philip Linney, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/780,725

(22) PCT Filed: Mar. 27, 2014

(86) PCT No.: PCT/GB2014/000120
§ 371 (c)(1),
(2) Date: Sep. 28, 2015

(87) PCT Pub. No.: WO2014/155042
PCT Pub. Date: Oct. 2, 2014

(65) Prior Publication Data
US 2016/0057022 A1    Feb. 25, 2016

(30) Foreign Application Priority Data
Mar. 28, 2013    (EP) .................................... 13250047

(51) Int. Cl.
*H04L 12/24* (2006.01)
*H04M 3/42* (2006.01)
*H04M 11/06* (2006.01)

(52) U.S. Cl.
CPC .......... *H04L 41/28* (2013.01); *H04L 41/0806* (2013.01); *H04M 3/42136* (2013.01); *H04M 11/062* (2013.01)

(58) Field of Classification Search
CPC ................ H04L 41/28; H04L 41/0806; H04M 3/42136; H04M 11/062
(Continued)

(56) References Cited

U.S. PATENT DOCUMENTS 6,690,789 B1   2/2004  Kowal et al.
7,065,072 B1   6/2006  Quiles et al.
(Continued)

FOREIGN PATENT DOCUMENTS

EP    2 023 536    2/2009
EP    2 533 436    12/2012

OTHER PUBLICATIONS

International Search Report for PCT/GB2014/000120 dated Jun. 6, 2014, four pages.

*Primary Examiner* — Marcus Hammonds
(74) *Attorney, Agent, or Firm* — Nixon & Vanderhye P.C.

(57) ABSTRACT

Currently, under bitstream access, communications providers are only given limited control over the services they offer. In order to prevent customers being accidently or maliciously reconfigured by a competitor, each communications provider's circuit is isolated from the other communications providers, and dynamic line management profile choice is maintained by the network operator. The present invention proposes allowing greater access to communications providers to configure physical layer configuration parameters associated with a line, through the use of an adaptation gateway. The adaptation gateway is used to manage configuration requests to digital subscriber lines from the communications providers. The adaptation gateway allows configuration of certain DSL line, channel or data path parameters (such as those listed in ITU-T Recom-
(Continued)

mendation G.997.1), but prevents modification to any of those parameters that might affect or cause harm to the service of another line.

18 Claims, 2 Drawing Sheets

(58) Field of Classification Search
USPC .......................................................... 455/410
See application file for complete search history.

(56) References Cited

U.S. PATENT DOCUMENTS

| 2009/0043894 | A1* | 2/2009 | Goderis | H04L 12/2889 |
| | | | | 709/226 |
| 2009/0049048 | A1* | 2/2009 | Justen | H04Q 3/0095 |
| 2016/0028434 | A1* | 1/2016 | Kerpez | H04B 3/32 |
| | | | | 379/406.02 |

* cited by examiner

ACCESS NETWORK MANAGEMENT

This application is the U.S. national phase of International Application No. PCT/GB2014/000120 filed 27 Mar. 2014 which designated the U.S. and claims priority to EP 13250047.1 filed 28 Mar. 2013, the entire contents of each of which are hereby incorporated by reference.

FIELD OF THE INVENTION

This invention relates to a method and system for controlling configuration requests to digital subscriber lines in a network.

BACKGROUND TO THE INVENTION

Local loop unbundling (LLU) allows communications providers (CPs) to provide network services, such as xDSL broadband services, over the physical connection between the telephone exchange and the customer's premises (the so called "local loop"), which is typically owned by an incumbent network operator. In the UK, most local loops are owned by BT. LLU allows ISPs to install their own equipment at telephone exchanges in order to connect customer lines to the ISPs' own networks and services.

Typically, in an LLU scenario, CPs will have their own digital subscriber line access modules (DSLAMs) and other network equipment installed at a telephone exchange. Customer lines coming into the exchange are directed to the CP's equipment instead of that of the network operator.

Under sub-loop unbundling (SLU), CPs can also interconnect with the local access network at a point between the exchange and the customer premises. The connection point is usually the primary connection point (PCP), which is typically a street cabinet. SLU can be used for VDSL services such as fibre to the cabinet (FTTC), where the equipment needs to be much closer to the customer premises.

However, SLU for next generation access (NGA) solutions such as FTTC are expensive to deploy, as there are only a small number of potential customers per cabinet. One solution offered is a bitstream access service, where a CP buys an active connection for a service such as FTTC from the network operator. The network operator owns and operates the DSLAM and other equipment required to provide the service. The CP does not have any direct access to the network infrastructure, as in LLU or SLU solutions, but only has access at the service level.

Under bitstream access, CPs are only given limited control over the services they offer and multiple CPs will offer services to their customers from the same DSLAM. In order to prevent customers being accidently or maliciously reconfigured by a competitor, each CP's circuit must be isolated from the other CPs and choice of DLM (dynamic line management) profile are maintained by the network operator providing the bitstream access service. DLM is a technique used for improving the stability of a DSL line. In most cases, the DLM profile of a customer's line is managed by the network operator and isolated from CP control. The CP therefore only has indirect control of how their customer's line operates via product options, which tend to define the service at a high level, e.g. an "up to xMbps service".

The limited choices available to the CP are managed via a CP interface into the network operator's OSS/BSS (operational support system/business support system), typically via an XML gateway. The CP is not provided any direct access to the network equipment, or its management platforms. This significantly limits the level of customisation available to a CP in respect of its customers' DSL services, and hence its level of differentiation from other CPs.

SUMMARY OF THE INVENTION

It is the aim of embodiments of the present invention to provide an improved system for communications providers to access and configure DSL services on a shared network.

According to one aspect of the present invention, there is provided a method for managing requests to configure digital subscriber lines in a network, wherein each digital subscriber line is associated with one of a plurality of communications providers, said method comprising:

providing access for the plurality of communication providers to configure a first set of physical layer configuration parameters of the digital subscriber lines associated with each respective communication provider; and restricting access for the communication providers to configure a second set of service parameters, wherein the second set of physical layer configuration parameters comprise service parameters associated with a digital subscriber line that when modified also have an adverse effect on the service on another digital subscriber line in the network.

Examples of the first set of physical layer configuration parameters may include the minimum and maximum permissible line rates.

Examples of the second set of physical layer configuration parameters may include vectoring, frequency control, limiting PSD mask, and choice of band plan.

Access to configure the second set of physical layer configuration parameters should be limited to the network operator. The access control can be provided by a gateway controlled by the operator of the network.

According to another aspect of the present invention, there is provided a gateway for managing requests to configure digital subscriber lines in a network, wherein each digital subscriber line is associated with one of a plurality of communications providers, said gateway adapted to:

provide access for the plurality communication providers to configure a first set of physical layer configuration parameters of the digital subscriber lines associated with each respective communication provider; and restrict access for the communication providers to configure a second set of physical layer configuration parameters, wherein the second set of service parameters comprise service parameters associated with a digital subscriber line that when modified also have an effect on the service on another digital subscriber line in the network.

Providing VULA (Virtual Unbundled Local Access) and giving other communications providers (CPs) the capability to set all of their own DSL line parameters can provide a negative experience overall for end users. For example, if different CPs chose different Upstream Power Backoff parameters, they could prevent customers on long lines belonging to another CP from achieving sync. The present invention advantageously provides a method for controlled access to the configuration of specific line parameters.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention propose the introduction of an adaptation gateway to manage configuration requests to digital subscriber lines from communications providers. The adaptation gateway allows configuration of certain line, channel or data path parameters, but prevents modification to any parameters that might affect the service of another line.

Figure 1:
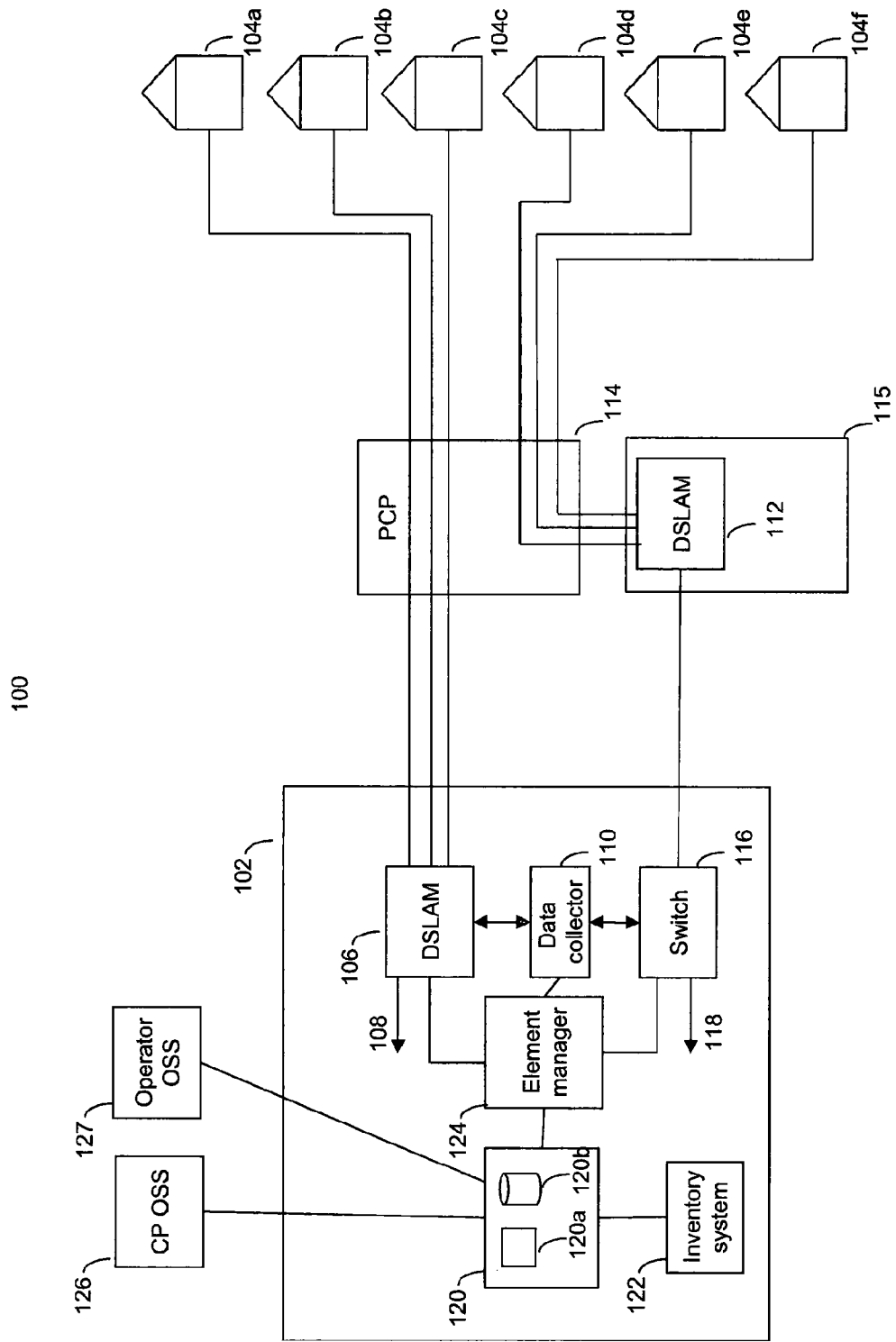
FIG. 1 is a diagram showing a telecommunications network in an example of the present invention.

FIG. 1 illustrates a telecommunications network 100 including a telephone exchange 102 providing communications services to customer's premises 104a, 104b, 104c, 104d, 104e and 104f. Each of the customer's premises 104a, 104b and 104c are connected to a digital subscriber access module DSLAM 106 over respective telephone lines, typically made of twisted copper or aluminium pairs of wires. The DSLAM 106 provides digital subscriber line (DSL) services to connected lines, often referred to as DSL lines. The DSLAM 106 provides onward connection to data services 108. A data collector 110 connected to the DSLAM is responsible for, amongst other things, gathering performance data from the DSLAM and the network as a whole, and generating dynamic line management (DLM) data. These components together represent a typical Asymmetric DSL (ADSL) service.

Also shown in the network 100 is a fibre to the cabinet (FTTC) based service such as very high speed DSL (VDSL2) provided to customer premises 104d, 104e and 104f. Each of these customer premises are connected to a DSLAM 112 located in a cabinet 115 adjacent to a primary connection point, here a street cabinet 114, via respective telephone lines. The lines associated with the ADSL service described above also run through the cabinet 114. The DSLAM 112 is then connected to a switch 116 in the exchange 102 via a fibre optic cable. The switch 116 has onward connections 118 for data services. The switch is also connected to the data collector 110, which provides the functionality described earlier, gathering both data from the switch itself as well as the DSLAM 112 and other network components. Whilst a single data collector has been shown, more than one can be used in practice.

Further, a person skilled in the art will appreciate that other elements exist in the network arrangement, including broadband remote access server (BRAS), distribution points, further DSLAMs, switches, additional lines and so on. However, FIG. 1 is intended to represent a simplified arrangement with the main features required to support the invention, and thus these other elements have been omitted for the sake of clarity. Furthermore, whilst DSLAMs have been shown, other elements might be substituted that provide similar services, such as a multi-service access node (MSAN).

The invention provides a further element, an adaptation gateway 120, which connects to the DSALM 108, the switch 116, and an inventory system 122. The adaptation gate 120 comprises a processor 120a and storage 120b.

All the elements described thus far, in relation to providing DSL services to the customer premises, are owned and operated by a network operator. However, the DSL service provided to each customer can be provided by $3^{rd}$ party communications providers (CPs) using these elements belonging to the network operator. In this example, we assume that services to customer premises 104a and 104b is provided by a first CP, services to customer premises 104c is provided by a second CP, services to customer premises 104d and 104e is provided by a third CP, and services to customer premises 104f is provided by a fourth CP.

The adaptation gateway 120 acts as a controller to handle line configuration requests from the various CPs relating to the service provided on the lines. Typical configuration requests include changes to the following upstream and downstream parameters: maximum or minimum rate, maximum, minimum or target margin, interleaving depth, retransmission delay, Impulse Noise protection (INP), PSD, power back-off, and so on for a line. A full set of these physical layer configuration parameters is defined in ITU-T G997.1 "Physical layer management for digital subscriber line (DSL) transceivers", where they are contained in the line, channel and data path configuration profiles associated with a line. Some of these physical layer configuration parameters are used for DLM. Requests can be made by CPs via a respective CP OSS (operational support system) 126, which will typically be hosted in a server located remotely at a CP premises, and connected to the adaptation gateway 120 over a suitable network connection. Only one CP OSS 126 has been shown in FIG. 1, but there are others for the other CPs. Similarly, the network operator can also make configuration requests via an element manager 124 that is connected to the adaptation gateway and manages the DSLAMs.

Figure 2:
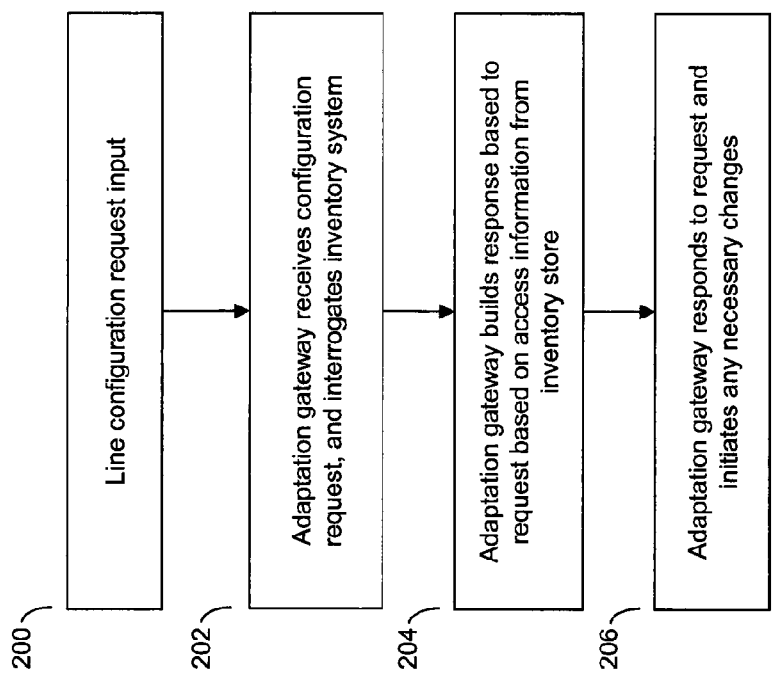
FIG. 2 is a flow chart summarising the steps of an example of the present invention.

The operation of the method is shown in the flow chart of FIG. 2. In step 200, a CP makes a configuration request on the CP OSS 126 to one or more physical layer configuration parameters. The CP OSS 126 forwards to the request to the adaptation gateway 120. The adaptation gateway receives the request in step 202, and consults the inventory system 122, which holds details of access and modification restrictions relating to services on the lines, and collects the relevant information relating to the request. The adaptation gateway 120 then builds a suitable response in step 204 based on the request and the access information from the inventory system 122, and then responds in step 206 with one of the following:

1. Reject the request and responding to the CP OSS with the relevant reason
2. Allow the request without modification, and instruct the relevant element to reconfigure the relevant parameters accordingly
3. Allow the request, but with modifications to only allow certain parameters to be modified, and instruct the relevant network elements accordingly The adaptation gateway also provides confirmation to the CP OSS once any parameters have been changed, as well as any changes that have been rejected.

The above process also applies to the network operator making configuration requests via adaptation gateway from their OSS 127. The main difference is in the access rights provided by the information store will differ significantly between CPs and the network operator as described below.

The aim of the adaptation gateway 120, in conjunction with the access data in the inventory system 122, is to provide the following functions:

Security to ensure that a CP can only create and control lines that are owned by the CP itself, but to prevent modification of certain 'infrastructure level' parameters that when modified affect other lines Security to allow a network operator (or an authorised third party) to access and modify all assets and physical layer configuration parameters on the network Capability to filter requests from a CP for modification of parameters, to ensure only those parameters that are allowed to be accessed and modified for a given network element are accessed and modified Capability for the network operator to modify or define the physical layer configuration parameters that affect more than one line Capability to restrict performance statistics, and test and diagnostics access to the owning CP and/or network operator.

Fundamentally, the adaptation gateway 120 should restrict CP modification to any physical layer configuration parameters or set of parameters associated with configuration attributes of a line that might affect the service on another line, but should consider requests relating to physical layer configuration parameters or set of parameters that only affect a single line. Some of the most important parameters that should have restricted access include configuration of transmission mode (i.e. VDSL2/ADSL2plus), vectoring settings (including the treatment of non-compliant CPE), choice of band plan (i.e. Plan998 ADE17), compliance to regulation in terms of spectrum usage, use of low power modes, use of seamless rate adaptation, Upstream and Downstream Power Backoff parameters (U/DPBO), and power limits (power spectral density) of each line, all of which can impact on the performance of other lines as a result of issues such as cross talk if they are not managed carefully in a controlled manner. The network operator only should be allowed access to modify such parameters.

Examples of parameters that a CP is allowed to modify via the adaptation gateway 120 include the maximum and minimum line rates (actual or effective), target maximum and minimum margin, maximum interleaving delay/Impulse noise protection (INP) when using interleaving, maximum delay when using physical layer retransmission. These parameters only impact on the line in question, in the sense that modification will not affect the performance of other lines in the network, and thus can be modified by both the CP owning that line, and network operator.

The rights to configure the various physical layer configuration parameters are held by the information store 122, which is used by the adaptation gateway 120 upon receiving a configuration request.

The adaptation gateway 120 takes a standardised control language and modifies the control commands such that they implement the invention based on access rights provided by the inventory system 122. The adaptation gateway may be functionally separated into CP aspects and network operator aspects to improve security.

A CPs only has access to its own OSS, and indirect access to the adaptation gateway. There is no direct access for a CP to any of the network infrastructure elements directly, such as the DSLAM. CPs can only affect the operation of any of these other elements through requests made via the adaptation gateway described above.

Exemplary embodiments of the invention are realised, at least in part, by executable computer program code which may be embodied in an application program data stored in storage 120b. When such computer program code is loaded into the memory of the processor 120a in the adaptation gateway 120, it provides a computer program code structure which is capable of performing at least part of the methods in accordance with the above described exemplary embodiments of the invention.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method for managing requests to configure digital subscriber lines in a network, wherein each digital subscriber line is associated with one of a plurality of communications providers, said method comprising:
   providing access for the plurality communication providers to configure a first set of physical layer configuration parameters of at least one of the digital subscriber lines associated with each respective communication provider; and
   restricting access for the communication providers to configure a second set of service parameters, wherein the second set of service parameters comprise physical layer configuration parameters associated with the at least one of the digital subscriber lines that when modified also have an adverse effect on a service on another digital subscriber line in the network.

2. A method according to claim 1, wherein the network is operated by a network operator and access to configure the second set of physical layer configuration parameters is restricted to the network operator.

3. A method according to claim 1, wherein the network is operated by a network operator and access is maintained by a gateway controlled by the network operator.

4. The method according to claim 1, wherein the physical layer configuration parameters forming the second set of service parameters include one or more of the following parameters of the at least one of the digital subscriber lines: configuration of transmission mode, vectoring settings, choice of band plan, compliance to spectrum usage regulation, use of low-power modes, use of seamless rate adaptation, power backoff parameters, or power limits.

5. The method according to claim 1, wherein the physical layer configuration parameters forming the second set of service parameters include configuration of transmission mode of the at least one of the digital subscriber lines.

6. The method according to claim 5, wherein the configuration of transmission mode of the at least one of the digital subscriber lines is VDSL2 or ADSL2plus.

7. The method according to claim 1, wherein the physical layer configuration parameters forming the second set of service parameters include vectoring settings of the at least one of the digital subscriber lines.

8. A gateway for managing requests to configure digital subscriber lines in a network, wherein each digital subscriber line is associated with one of a plurality of communications providers, said gateway adapted to:
   provide access for the plurality communication providers to configure a first set of physical layer configuration parameters of at least one of the digital subscriber lines associated with each respective communication provider; and
   restrict access for the communication providers to configure a second set of physical layer configuration parameters, wherein the second set of service parameters comprise service parameters associated with the at least one of the digital subscriber lines that when modified also have an adverse effect on a service on another digital subscriber line in the network.

9. The gateway according to claim 8, wherein the physical layer configuration parameters forming the second set of service parameters include one or more of the following parameters of the at least one of the digital subscriber lines: configuration of transmission mode, vectoring settings, choice of band plan, compliance to spectrum usage regulation, use of low-power modes, use of seamless rate adaptation, power backoff parameters, or power limits.

10. The gateway according to claim 8, wherein the physical layer configuration parameters forming the second set of service parameters include configuration of transmission mode of the at least one of the digital subscriber lines.

11. The gateway according to claim 10, wherein the configuration of transmission mode of the at least one of the digital subscriber lines is VDSL2 or ADSL2plus.

12. The gateway according to claim 8, wherein the physical layer configuration parameters forming the second set of service parameters include vectoring settings of the at least one of the digital subscriber lines.

13. A gateway for managing requests to configure digital subscriber lines in a network, wherein each digital subscriber line is associated with one of a plurality of communications providers, said gateway being configured to:
    enable a first communication provider of the plurality of communications providers to modify a first set of physical layer configuration parameters of at least one digital subscriber line associated with the first communication provider; and
    prevent the first communication provider from modifying a second set of physical layer configuration parameters of the at least one digital subscriber line that affect a service on another digital subscriber line, to thereby ensure that the first communication provider can only control the at least one digital subscriber line associated with the first communication provider.

14. The gateway according to claim 13, wherein the network is operated by a network operator and the gateway is further configured to provide security such that the network operator is allowed to modify the first and second sets of physical layer configuration parameters whereas the first communication provider can only modify the first set of physical layer configuration parameters and not the second set of physical layer configuration parameters.

15. The gateway according to claim 13, wherein the physical layer configuration parameters forming the second set of service parameters include one or more of the following parameters of the at least one digital subscriber line: configuration of transmission mode, vectoring settings, choice of band plan, compliance to spectrum usage regulation, use of low-power modes, use of seamless rate adaptation, power backoff parameters, or power limits.

16. The gateway according to claim 13, wherein the physical layer configuration parameters forming the second set of service parameters include configuration of transmission mode of the at least one digital subscriber line.

17. The gateway according to claim 16, wherein the configuration of transmission mode of the at least one digital subscriber line is VDSL2 or ADSL2plus.

18. The gateway according to claim 13, wherein the physical layer configuration parameters forming the second set of service parameters include vectoring settings of the at least one digital subscriber line.

* * * * *